United States Patent

Frappier et al.

[11] Patent Number: 5,807,639
[45] Date of Patent: Sep. 15, 1998

[54] ELASTOMER-AND-THERMOPLASTIC COMPOSITE, AND METHODS OF MANUFACTURE

[75] Inventors: Alain Frappier, Montargis; Nicolas Garois, Amilly, both of France

[73] Assignee: Hutchinson, France

[21] Appl. No.: 584,511

[22] Filed: Jan. 11, 1996

[30] Foreign Application Priority Data

Jan. 12, 1995 [FR] France .................................. 95 00307

[51] Int. Cl.[6] .................................................. B32B 27/08
[52] U.S. Cl. ................................. 428/475.5; 428/475.8; 428/476.1; 428/476.3; 428/476.9; 428/492; 428/523
[58] Field of Search .............................. 428/475.5, 475.8, 428/476.1, 476.3, 476.9, 492, 523

[56] References Cited

U.S. PATENT DOCUMENTS

| | | | |
|---|---|---|---|
| 4,048,362 | 9/1977 | Moring et al. | 428/395 |
| 4,673,620 | 6/1987 | Shulman et al. | 428/523 |
| 4,725,492 | 2/1988 | Yazaki et al. | 428/476.9 |
| 4,897,298 | 1/1990 | Otawa et al. | 428/475.8 |
| 5,068,137 | 11/1991 | Ozawa et al. | 428/523 |

FOREIGN PATENT DOCUMENTS

A-0 341 068  5/1989  European Pat. Off. .
A-0 518 354  6/1992  European Pat. Off. .

*Primary Examiner*—Karen A. Dean

[57] ABSTRACT

A thermoplastic and elastomer composite product and methods of manufacturing it, e.g. a section member comprising a strength member of thermoplastic including a modifying agent such as a poly(1,2-vinyl butadiene) or an ethylene-propylene grafted with maleic anhydride, a thin layer of elastomer including a modifying agent such as an organo-silane or an ethylene-propylene grafted with maleic anhydride, and a sealing lip of elastomer that does not include modifying agent. The invention provides total adhesion between the thermoplastic and the elastomer.

16 Claims, 2 Drawing Sheets

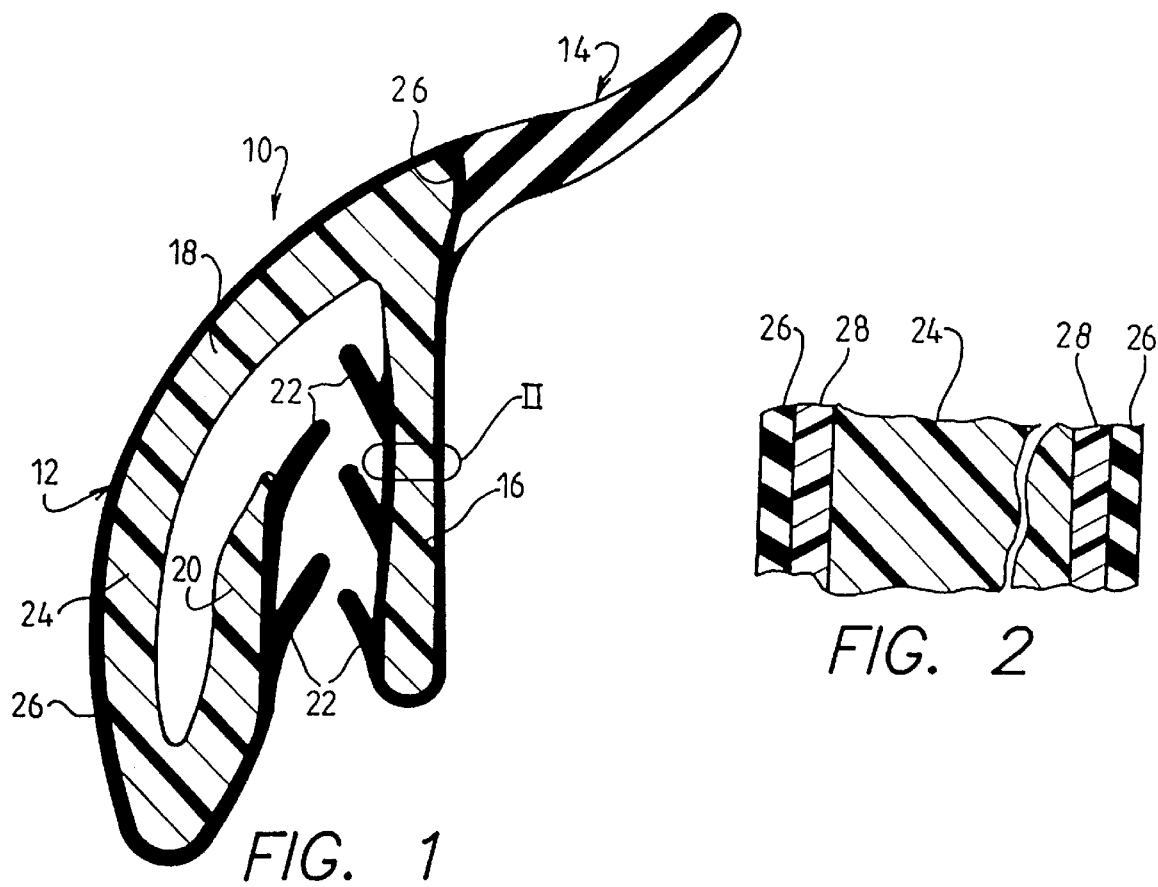
FIG. 1
FIG. 2
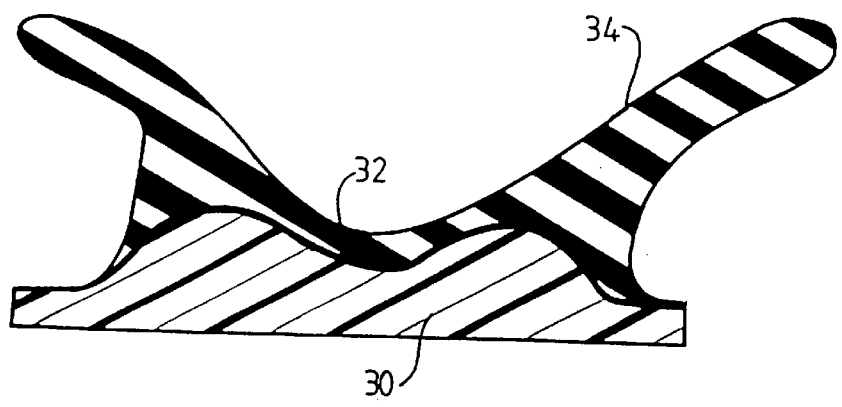
FIG. 3

ELASTOMER-AND-THERMOPLASTIC COMPOSITE, AND METHODS OF MANUFACTURE

The invention relates to a composite product made of elastomer and of thermoplastic, and to methods of manufacturing it.

BACKGROUND OF THE INVENTION

Numerous products used in a very wide range of industrial fields comprise metal associated with elastomer in such a manner as to benefit firstly from the elasticity of elastomers and their capacity for absorbing vibration, and also from the stiffness and other mechanical properties of metals, with such products generally having the functions of sealing and/or damping vibrations.

Nevertheless, the use of metals in such products suffers from a certain number of drawbacks, such as risk of corrosion and the need to protect uncovered areas of metal, a lack of natural adhesion between elastomers and metals, electrical and thermal conductivity, high density, sometimes high cost, weakness of thin pieces in bending, etc. . . .

Attempts have already been made to replace metals by thermoplastics, some of which have mechanical properties that are quite close to those of metals, are cheaper, of lower density, of very low or zero electrical and thermal conductivity, present no risk of corrosion, etc.

Unfortunately, there remains the problem of adhesion between thermoplastics and elastomers, and this has led to the use of intermediate layers of adhesive substances that are often very expensive and that provide adhesion that is of more or less good quality between thermoplastics and elastomers, which adhesion is not always uniform over the entire thermoplastic-elastomer interface.

OBJECTS AND BRIEF SUMMARY OF THE INVENTION

An object of the invention is to avoid those drawbacks by providing direct and total adhesion between a thermoplastic and an elastomer without using one or more intermediate layers of adhesive substance or the like.

An object of the invention is to provide composite products made of thermoplastic and of elastomer in which adhesion between the thermoplastic and the elastomer is so great that it is impossible to separate them without tearing the elastomer.

Another object of the invention is to provide methods of manufacturing such products, enabling them to be made at low cost, continuously, and automatically by extrusion or by injection-, compression-, or transfer-molding.

The invention thus provides an elastomer-and-thermoplastic composite product, in which adhesion between the elastomer and the thermoplastic at their interface is the result of incorporating modifying agents in the elastomer and in the thermoplastic, the modifying agents of the elastomer comprising an organo-silane or an ethylene-propylene grafted with maleic anhydride, and the modifying agents of the thermoplastic comprising a poly(1,2-vinyl butadiene), an ethylene-propylene grafted with maleic anhydride, or an organo-silane.

The thermoplastic is a polypropylene or a technical polyamide, such as PA6, PA66, PA6/10, PA6/12, PA11, or PA12, or a polypropylene-polyamide alloy.

The elastomer is preferably selected from the group comprising: natural rubber (NR); synthetic polyisoprene (isoprene rubber IR); hydrogenated nitrile rubbers(HNBR) (hydrogenated acrylonitrile-butadiene copolymers); epichlorhydrin ethylene oxide copolymers (epichlorhydrin co-ethylene oxides ECO); ethylene-acrylic elastomers sold under the name "VAMAC"; chlorosulfonated polyethylenes (chlorosulfonated monomers CSM); ethylene-propylene-diene terpolymers (ethylene-propylene-diene monomers EPDM); butyl rubbers (isoprene isobutene rubbers IIR); and halogenated butyl rubbers (halogenated isobutene-isoprene rubbers XIIR).

In such a product, adhesion between the thermoplastic and the elastomer is total in that any attempt at separating the thermoplastic from the elastomer causes the product to be destroyed.

Advantageously, the thermoplastic is filled with organic or inorganic fibers at concentrations preferably lying in the range about 5% to about 50% by weight.

The thermoplastic portion can then act as a strength member, reinforcement, an insert, a support, etc. . . .

To keep costs down, by reducing the quantities of modifying agents that are incorporated in the thermoplastic and in the elastomer, it is possible to provide for a thin layer of thermoplastic including the modifying agent to be formed between the elastomer and another layer of thermoplastic that does not include the modifying agent.

Similarly, it is possible to form a thin layer of elastomer including the modifying agent between the thermoplastic and another layer of elastomer that does not include the modifying agent.

The invention also provides a method of manufacturing a product as described above, which method consists in extruding a section member including an above-mentioned modifying agent, then in covering the section member at least in part by extruding an elastomer including an above-mentioned modifying agent, and in vulcanizing the elastomer.

Such a method has the advantage of enabling manufacture to be continuous, automatable, cheap, and easy to implement for the person skilled in the art.

According to another characteristic of the invention, the method consists in coextruding a thermoplastic section member that does not include modifying agent and a layer of thermoplastic including the modifying agent, which layer is deposited on at least a portion of said section member, then in extruding the elastomer on said layer of thermoplastic that includes the modifying agent.

According to another characteristic of the invention, the method consists in coextruding an intermediate layer of elastomer that includes the modifying agent onto the thermoplastic section member plus an elastomer coating that does not include the modifying agent, which elastomer coating is deposited on said intermediate layer of elastomer.

The thermoplastic section member is preferably shaped and cooled prior to extrusion of the elastomer.

The invention also proposes another method of manufacturing this product, wherein it consists in molding a part out of a thermoplastic including an above-mentioned modifying agent, and then in molding an elastomer including the above-mentioned modifying agent onto the thermoplastic part, by injection, compression, or transfer, and in vulcanizing the elastomer.

In a first implementation of the invention, the method consists, prior to overmolding the elastomer, in molding a part made of thermoplastic that does not include the modifying agent plus a thin layer of thermoplastic that does include the modifying agent by two-material injection molding, which thin layer covers the thermoplastic part at least in part.

In another implementation, the method consists in molding a thin layer of elastomer including the modifying agent onto said thermoplastic part, and in molding another layer of elastomer that does not include the modifying agent onto said thin layer.

In general, the invention presents the following advantages:

adhesion between the thermoplastic and the elastomer without interposing one or more layers of adhesive materials;

replacement of metal in associations with elastomers;

lighter weight products;

no electrical conductivity (except when carbon fibers are incorporated in the thermoplastic);

resistance to bending and to mechanical fatigue;

products of lower cost than equivalent products including an association of metal and elastomer;

very low thermal conductivity;

total absence of corrosion; and very good thermal behavior at temperatures of use.

There are numerous applications for the invention in a very wide range of fields, e.g. as supports for engines or vibrating members in industry in general and in vehicles (motor vehicles, aircraft, ships, etc. . . . ), sealing strips that can be used in all fields, static or dynamic gaskets that can be used in all industries, antivibration supports suitable for use in all fields, and it is also applicable to pneumatic tires, to textiles, and to footwear.

BRIEF DESCRIPTION OF THE DRAWINGS

The invention will be better understood and other characteristics, details, and advantages thereof will appear more clearly on reading the following description, given by way of example and with reference to the accompanying drawings, in which:

FIG. 1 is a diagrammatic section view on a large scale through a sealing strip of the invention;

FIG. 2 is a view on a larger scale of the detail in circle II of FIG. 1;

FIG. 3 is a diagrammatic section view through another product of the invention;

MORE DETAILED DESCRIPTION

Figure 4:
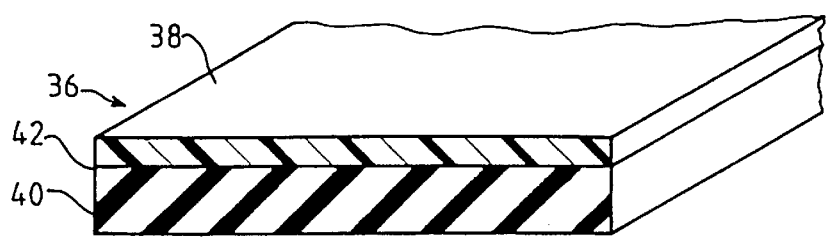
FIG. 4 is a fragmentary diagrammatic section view through yet another product of the invention.

Reference is made initially to FIGS. 1 and 2 where a first embodiment of a product of the invention is shown, which product is constituted in this case by a sealing strip usable as a "wiping gasket" in the car industry and which comprises, in the prior art, a channel section metal strength member that is completely cased in elastomer, with all of the drawbacks mentioned above.

The strip 10 constitutes a section member comprising a portion 12 for mounting on a support such as the edge of a metal sheet, and a sealing lip 14 designed to press against a movable window glass.

The portion 12 is approximately U-shaped in section comprising a rectilinear first branch 16 and a curved second branch 18 whose end 20 is folded through 180° inside the portion 12, facing the first branch 16, with the facing faces of the first branch 16 and of the folded end 20 including lips or tongues 22 pointing towards the inside of the U-shape and preventing the strip 10 being pulled off its support, in a manner well known to the person skilled in the art.

This configuration makes it possible to fix the strip 10 on its support by the effect of its portion 12 clamping on the support.

Essentially, the portion 12 of the strip is constituted by a relatively stiff thermoplastic strength member 24 which is coated over the major portion of its extent in a thin layer 26 of elastomer for sealing and appearance purposes, and which also serves to constitute the above-mentioned lip 14 and lips or tongues 22.

The substance used for the strength member 26 is preferably a polypropylene or a technical polyamide such as PA6, PA66, PA6/10, PA6/12, PA11, or PA12, or a PP-PA alloy that is preferably filled with fibers that are inorganic (e.g. of silica, glass, ceramic, or carbon) or organic (e.g. of meta- or para-aramide, polyamide, or liquid crystal polymers), in quantities that may lie in the range about 5% to about 50% by weight depending on the mechanical characteristics required for the strength member 26.

The elastomer constituting the thin layer 26 of coating, the lip 14, and the lips or tongues 22 is preferably selected from the group comprising: NR, IR, HNBR, ECO, "VAMAC", CSM, EPDM, IIR, and XIIR, which are all elastomers that can be vulcanized with sulfur or with organic peroxides.

Perfect and complete adhesion between the elastomer and the thermoplastic is obtained by incorporating modifying agents in the elastomer and in the thermoplastic at concentrations of less than 10% by weight, with the modifying agent in the thermoplastic being ethylene-propylene (EP) grafted with maleic anhydride, or poly(1,2-vinyl butadiene), or indeed a silane, the modifying agent of the elastomer being an organo-silane or an ethylene-propylene grafted with maleic anhydride (it being understood that it is not necessary to use the same modifying agent for the thermoplastic and for the elastomer).

The elastomer is preferably modified on the basis of an organo-silane with or without poly(1,2-vinyl butadiene), and the thermoplastic (PA or PA-PP alloy) is preferably modified on the basis of poly(1,2-vinyl butadiene).

By way of example, it is possible to use as the elastomer an EPDM having the following composition:

| | |
|---|---|
| EPDM | 100 parts |
| Paraffin plasticizer | 50 parts |
| Zinc oxide | 5 parts |
| Carbon black | 70 parts |
| Vulcanization coagent | 1 part |
| Vinyl silane (or E-P grafted with maleic anhydride) | 10 parts |
| poly(1, 2-vinyl butadiene) | 5 parts |
| Peroxide | 10 parts |

The adhesion of this EPDM on polyamides including the above-mentioned modifying agent is total.

Products of the invention have been tested for resistance against being peeled apart, and those tests have given results that are most satisfactory, as summarized below:

| Thermoplastic = | PA66 + grafted EP | PA66 + poly (1,2vinylBR) |
|---|---|---|
| Elastomer = EPDM + organo-silane | 0.6 | 3.6 (R) |
| EPDM + grafted EP | 2.6 (R) | 2.5 (R) |
| ECO vulcanized with peroxides + organo-silane | 1.2 (R) | 2.5 (R) |

Resistance to peeling apart is given in daN/cm. (R) means that the product ruptured without separation at the elastomer-polyamide interface. Grafted EP is an abbreviation for ethylene-propylene grafted with maleic anhydride. BR is an abbreviation for butadiene.

As shown diagrammatically in FIG. 2, it is preferable to make the strength member 24 out of a thermoplastic that does not include the above-mentioned modifying agent and to cover those portion thereof which are to be associated with the elastomer in a thin layer 28 of the same thermoplastic including the above-mentioned modifying agent. This makes it possible to reduce the cost of the strip 10 and avoids incorporating the modifying agent throughout the strength member 24.

Similarly, with respect to the elastomer, the corresponding modifying agent need only be incorporated in the thin layer 26 that covers the strength member 24 and there is no need to incorporate the modifying agent in the sealing lip 14 so long as the thin layer 26 exists between the lip and the thermoplastic strength member 24.

FIG. 3 is a diagram of another product of the invention which is not a section member but is a molded part, comprising a support 30 made of a thermoplastic such as polypropylene or one of the above-mentioned technical polyamides or a PP-PA alloy, without the above-mentioned modifying agent, a thin layer 32 of the same thermoplastic including the above-mentioned modifying agent and covering the corrugated top face of the support 30, and a portion 34 made of elastomer that includes the above-mentioned modifying agent, and that is secured to the thin layer 30 over the major portion of the extent thereof.

In another embodiment, as shown in FIG. 4, the product of the invention may be in the form of a plate or panel 36 comprising a layer 38 of thermoplastic including the above-mentioned modifying agent, and a thickness 40 of elastomer secured to the layer 38, the elastomer including the above-mentioned modifying agent, or not including it, in which case it is connected to the thermoplastic layer 38 via a thin layer 42 of elastomer including the modifying agent and formed at the interface between the layers 38 and 40.

Products of the invention, such as that shown in FIG. 3, can be made by molding, e.g. injection molding, as follows:

initially, the portion 30 made of thermoplastic that does not include the modifying agent and the thin layer 32 that does include the modifying agent is made by two-substance injection molding in the same mold.

The thermoplastic part 30, 32 can then be unmolded and placed in another mold where the portion 34 is overmolded thereon by injecting elastomer that contains the modifying agent, after which the elastomer is vulcanized by being heated in the overmolding mold.

In a variant, it is naturally possible to mold the support 30 in a thermoplastic that contains a modifying agent, and then to mold the portion 34 onto the support using an elastomer that contains a modifying agent.

In another variant, it is also possible to mold by two-material injection a thin layer of elastomer containing the modifying agent onto the part made of thermoplastic, together with another layer of elastomer that does not include the modifying agent and that covers the above-mentioned thin layer.

When the products of the invention are made by molding, with the elastomer being vulcanized by being heated in the mold, it is preferable to use an elastomer that is vulcanized by organic peroxides. Vulcanization is then a three-stage radical reaction (decomposition of the peroxides, initiating polymer chains, and cross-linking) enabling free radicals to be introduced into the interface layers, thereby turning sites that would otherwise be stable into reaction sites.

In addition, molding pressure further improves adhesion of the elastomer on the thermoplastic.

Figure 5:
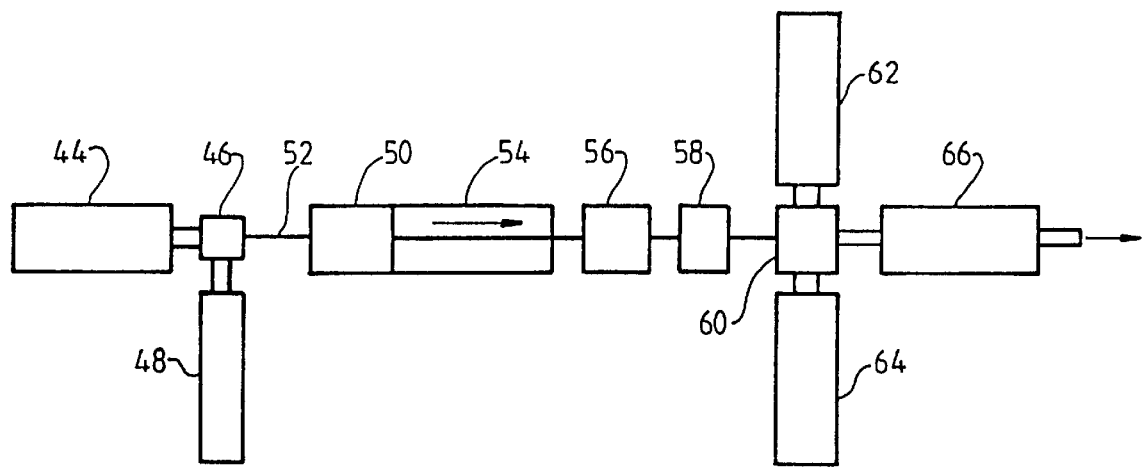
FIG. 5 is a block diagram of means for manufacturing a product of the invention.

Products of the invention can also be made by extrusion, for example using the apparatus shown diagrammatically in FIG. 5.

This apparatus comprises a thermoplastic extruder 44 whose outlet is connected to an extrusion head 46 that is simultaneously fed from another thermoplastic extruder 48, the extrusion head 46 being followed by a shaper or calibrator 50 in which the section member 52 leaving the extrusion head 46 through which is caused to pass, the shaper or calibrator 52 itself being followed by a cooling trough 54.

Downstream from the trough there is a drying system 56 followed by puller means 58.

Thereafter there is a crosshead 60 for covering the section member 52 in elastomer, the head 60 being fed by two elastomer extruders 62 and 64 respectively.

The outlet from the head 60 feeds means 66 for vulcanizing the elastomer continuously or discontinuously.

The section member 10 shown in FIGS. 1 and 2 can be manufactured using the apparatus of FIG. 5.

Under such circumstances, the extruder 44 provides the thermoplastic that does not include the modifying agent for the purpose of making the strength member 24, while the extruder 48 provides the same thermoplastic in which the above-mentioned modifying agent has been incorporated so as to form a thin layer 28 that covers the strength member 24 or at least those portions thereof that are to receive the layer 26 of elastomer.

The section member 52 leaving the extruder head 46 thus comprises the strength member 24 coated in the thin layer 28 of modified thermoplastic.

When the non-modified thermoplastic constituting the strength member 24 is filled with fibers, e.g. glass fibers, the thin layer 28 of modified thermoplastic covering said strength member does not include fibers, thereby greatly reducing wear in the shaper or calibrator 50 through which the section member 52 passes before being cooled.

The dried and drawn section member is then brought to the head 60 where a thin layer 26 of modified elastomer is deposited on the thin layer 28 of modified thermoplastic and where the sealing lip 14 of non-modified elastomer is formed on a portion of said thin layer 26.

The elastomer is vulcanized in the means 66 by heating, without pressure.

In general, the thermoplastics used in the invention are selected to satisfy the following conditions:

they have a temperature of deformation under load which is greater than about 140° C. (the vulcanization temperature of elastomers);

their molecular composition is compatible with that of the elastomers;

they are cheap;

they have stiffness close to that of metals;

they are extrudable and injectable;

their physico-chemical properties comply with the specifications required in industry;

they are very hard;

they are of low density (relative density less than 1.5); and they have good dimensional stability, low shrinkage (e.g. less than 0.5%), and a small coefficient of thermal expansion.

They advantageously replace metals in associations with elastomers, and they present the additional advantage of being easily deformable and shapeable by heating to medium temperature.

We claim:

1. A composite laminate product, comprising a layer of elastomer adhering to a layer of thermoplastic, wherein adhesion between the elastomer and the thermoplastic at their interface is the result of incorporating modifying agents in the elastomer and in the thermoplastic, the modifying agents of the elastomer comprising an organo-silane or an ethylene-propylene grafted with malleic anhydride, and the modifying agents of the thermoplastic comprising a poly(1, 2-vinyl butadiene), an ethylene-propylene grafted with maleic anhydride, or an organo-silane.

2. A product according to claim 1, wherein the modifying agent of the elastomer comprises an organo-silane, said modifying agent of the elastomer further comprising poly (1,2-vinylbutadiene).

3. A product according to claim 1, wherein the thermoplastic is a polypropylene, a technical polyamide, or a polypropylene-polyamide alloy.

4. A product according to claim 1, wherein the thermoplastic is filled with fibers that are organic or inorganic, at a concentration lying in the range about 5% to about 50% by weight.

5. A product according to claim 1, wherein the elastomer is selected from the group comprising natural rubber, synthetic, isoprene, hydrogenated nitrile rubbers, epichlorhydrin ethylene oxide copolymers, chlorosulfonated polyethylenes, ethylene-propylene-diene terpolymers, butyl rubbers, halogenated butyl rubbers, and ethylene-acrylic elastomers, suitable for being vulcanized with sulfur or with organic peroxides.

6. A product according to claim 1, wherein the quantities of modifying agents incorporated in the thermoplastic and in the elastomer are less than 10% by weight.

7. A product according to claim 1, wherein the thermoplastic containing the modifying agent forms a thin layer between the elastomer and a thermoplastic that does not include the modifying agent.

8. A product according to claim 1, wherein the elastomer containing the modifying agent forms a thin layer between the thermoplastic and an elastomer that does not include the modifying agent.

9. A product according to claim 1, wherein the thermoplastic constitutes a strength member, reinforcement, an insert, or a support of said product.

10. A method of manufacturing a product as defined in claim 1, wherein the method consists in extruding a section member including an above-mentioned modifying agent, then in covering the section member at least in part by extruding an elastomer including an above-mentioned modifying agent, and in vulcanizing the elastomer.

11. A method according to claim 1, consisting in coextruding a thermoplastic section member that does not include modifying agent and a layer of thermoplastic including the modifying agent, which layer is deposited on at least a portion of said section member, then in extruding the elastomer on said layer of thermoplastic that includes the modifying agent.

12. A method according to claim 10, consisting in coextruding an intermediate layer of elastomer that includes the modifying agent onto the thermoplastic section member plus an elastomer that does not include the modifying agent, which elastomer coating is deposited on said intermediate layer of elastomer.

13. A method according to claim 10, consisting in shaping and cooling the thermoplastic section member prior to extruding the elastomer.

14. A method of manufacturing a product as defined in claim 1, wherein the method consists in molding a part out of a thermoplastic including an above-mentioned modifying agent, and then in molding an elastomer including the above-mentioned modifying agent onto the thermoplastic part, and in vulcanizing the elastomer.

15. A method according to claim 14, consisting, prior to overmolding the elastomer, in molding a part made of thermoplastic that does not include the modifying agent plus a thin layer of thermoplastic that does include the modifying agent by two-material injection molding, which thin layer covers the thermoplastic part at least in part.

16. A method according to claim 14, consisting in molding a thin layer of elastomer including the modifying agent onto said thermoplastic part, and in molding another layer of elastomer that does not include the modifying agent onto said thin layer.

* * * * *